(12) United States Patent
Tajima (10) Patent No.: US 11,570,599 B2
(45) Date of Patent: Jan. 31, 2023

(54) MOBILE COMMUNICATION TERMINAL AND CONTROL METHOD THEREFOR

(71) Applicant: MAXELL, LTD., Kyoto (JP)

(72) Inventor: Kazuyuki Tajima, Tokyo (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 16/098,422

(22) PCT Filed: May 31, 2016

(86) PCT No.: PCT/JP2016/066060
§ 371 (c)(1),
(2) Date: Nov. 1, 2018

(87) PCT Pub. No.: WO2017/208363
PCT Pub. Date: Dec. 7, 2017

(65) Prior Publication Data
US 2019/0104391 A1 Apr. 4, 2019

(51) Int. Cl.
*H04W 4/80* (2018.01)
*G06F 21/35* (2013.01)
(Continued)

(52) U.S. Cl.
CPC .............. *H04W 4/80* (2018.02); *G06F 21/35* (2013.01); *H04L 63/08* (2013.01); *H04W 12/06* (2013.01);
(Continued)

(58) Field of Classification Search
CPC ..... H04W 4/80; H04W 12/002; H04W 12/06; H04W 12/1206; H04W 4/02; H04W 4/021; H04W 4/027; H04L 63/08; G06F 21/35
See application file for complete search history.

(56) References Cited

U.S. PATENT DOCUMENTS 10,257,204 B2 * 4/2019 Li ........................... G06F 21/31
2006/0105755 A1 * 5/2006 Brandt ................ H04M 1/7253
455/418
(Continued)

FOREIGN PATENT DOCUMENTS

CN 104778425 A 7/2015
JP 2000-215374 A 8/2000
(Continued)

OTHER PUBLICATIONS

International Search Report and Written Opinion issued in International Patent Application No. PCT/JP2016/066060, dated Jul. 12, 2016; with partial English translation.
(Continued)

*Primary Examiner* — Lester G Kincaid
*Assistant Examiner* — Maryam Soltanzadeh
(74) *Attorney, Agent, or Firm* — McDermott Will & Emery LLP (57) ABSTRACT

A mobile communication terminal A performs near field communication with another mobile communication terminal B by a near field communication unit and obtains a communication distance with another mobile communication terminal B. An information acquisition unit acquires information on another mobile communication terminal B, information on the mobile communication terminal A, or both of the information when the communication distance to the other mobile communication terminal B is equal to or more than a threshold. An abnormality determination unit determines an abnormal state of the mobile communication terminal A based on information (position information, wearing information, or the like) acquired by the information acquisition unit. When the abnormality determination unit determines that the mobile communication terminal A is in the abnormal state, a lock unit locks the mobile commu- (Continued)

nication terminal A, the other mobile communication terminal B or both of those mobile communication terminals.

15 Claims, 9 Drawing Sheets

(51) Int. Cl.
    *H04L 9/40*         (2022.01)
    *H04W 12/30*      (2021.01)
    *H04W 12/126*     (2021.01)
    *H04W 12/33*      (2021.01)
    *H04W 12/06*      (2021.01)
    *H04W 4/02*       (2018.01)
    *H04W 4/021*      (2018.01)

(52) U.S. Cl.
    CPC ......... *H04W 12/126* (2021.01); *H04W 12/30* (2021.01); *H04W 12/33* (2021.01); *G06F 2221/2111* (2013.01); *H04W 4/02* (2013.01); *H04W 4/021* (2013.01); *H04W 4/027* (2013.01)

(56) References Cited

U.S. PATENT DOCUMENTS

| | | | | |
|---|---|---|---|---|
| 2010/0026509 A1* | 2/2010 | Boehm | .................. | G08G 1/166 340/686.6 |
| 2013/0316726 A1* | 11/2013 | Laws | ...................... | H04L 67/42 455/456.1 |
| 2014/0375273 A1* | 12/2014 | Harada | ................... | G06F 1/263 320/136 |
| 2015/0039880 A1* | 2/2015 | Aminzade | ......... | H04M 1/72527 713/100 |
| 2015/0204676 A1* | 7/2015 | Zhang | ................... | G01S 5/0263 701/410 |
| 2016/0006745 A1* | 1/2016 | Furuichi | ............... | H04L 63/105 726/28 |
| 2016/0029294 A1* | 1/2016 | Kim | .................... | H04W 52/283 455/456.3 |
| 2017/0307722 A1 | 10/2017 | Zhang et al. | | |

FOREIGN PATENT DOCUMENTS

| | | |
|---|---|---|
| JP | 2004170429 A | 6/2004 |
| JP | 2008022295 A | 1/2008 |
| JP | 2008-269019 A | 11/2008 |
| JP | 2014-170429 A | 9/2014 |
| JP | 2014-192583 A | 10/2014 |
| WO | 2016/054773 A1 | 4/2016 |

OTHER PUBLICATIONS

Office Action received in J.P. Patent Application No. 2018-520258, dated Jan. 28, 2020, with English translation.
Chinese Office Action issued in corresponding Chinese Patent Application No. 201680086302.2, dated Jun. 25, 2021, with English translation.
Chinese Office Action issued in corresponding Chinese Patent Application No. 201680086302.2, dated Apr. 6, 2022, with English translation.

* cited by examiner

| | MOVING STATE | | | |
|---|---|---|---|---|
| MOBILE COMMUNICATION TERMINAL A | DURING MOVING | STATIONARY | DURING MOVING | STATIONARY |
| MOBILE COMMUNICATION TERMINAL B | STATIONARY | DURING MOVING | DURING MOVING | STATIONARY |
| LOCK | UN-NECESSARY | UN-NECESSARY | NECESSARY | UN-NECESSARY |

| | | MOVING STATE | | | |
|---|---|---|---|---|---|
| MOBILE COMMUNICATION TERMINAL A | | DURING MOVING | STATIONARY | DURING MOVING | STATIONARY |
| MOBILE COMMUNICATION TERMINAL B | | STATIONARY | DURING MOVING | DURING MOVING | STATIONARY |
| LOCK | INDOOR | UNNECESSARY | UNNECESSARY | NECESSARY | UNNECESSARY |
| | OUTDOOR | NECESSARY | NECESSARY | NECESSARY | UNNECESSARY |

MOBILE COMMUNICATION TERMINAL AND CONTROL METHOD THEREFOR

CROSS-REFERENCE OF RELATED APPLICATIONS

This application is the U.S. National Phase under 35 U.S.C. § 371 of International Patent Application No. PCT/JP2016/066060, filed on May 31, 2016, the entire disclosure of which Application is incorporated by reference herein.

TECHNICAL FIELD

The present invention relates to a technology for preventing loss or theft of a mobile communication terminal.

BACKGROUND ART

As a technology for preventing the loss of a mobile communication terminal, there is a technology disclosed in, for example, PTL1. The PTL1 discloses "a mobile communication terminal including near field communication means for performing near field communication with another mobile communication terminal; locking means for transitioning to a locked state in which authentication is requested from external operation when it is determined that a distance from another mobile communication terminal is equal to or more than a predetermined value based on a communication status with another mobile communication terminal by the near field communication means; receiving means for receiving, from another mobile communication terminal, authentication information for releasing the locked state upon confirming that the communication with another communication terminal is enabled; lock release means for releasing the locked state based on the authentication information received by the receiving means; and condition setting means for setting a permission condition for permitting at least one of the transition to the locked state by the locking means and the release of the locked state by the lock release means.

CITATION LIST

Patent Literature

PTL1: Japanese Patent Application Laid-Open No. 2014-170429

SUMMARY OF INVENTION

Technical Problem

In recent years, with the advancement of high performance and advanced functions of the mobile communication terminals, the mobile communication terminals have become widespread. Examples of the mobile communication terminals diversely include cellular phones typified by smartphones, smart watches which are wristwatch-type mobile communication terminals, eyeglasses head mounted display which is a wearable device, and so on. On the other hand, when the mobile communication terminal is lost or stolen, an influence of caused by the lost or theft such as loss of personal information is large, and a method of effectively preventing the loss and theft is required. PTL1 discloses a technique for preventing the loss and theft by cooperating with multiple mobile information terminals and locking the mobile information terminal by using information on a distance between the terminals.

However, the method disclosed in PTL1 suffers from such a problem that the terminal is unnecessarily locked without understanding whether a cause of the distance to another terminal being equal to or more than the predetermined value resides in the loss or theft or a temporary event such as a user's leaving. Further, when near field communication with another terminal cannot be performed, information on another terminal cannot be acquired, which makes it difficult to accurately determine whether the terminal is to be locked, or not.

An object of the present invention is to precisely detect an abnormal state such as loss or theft of a mobile information terminal and avoid unnecessarily locking the terminal.

Solution to Problem

The above object is solved by the invention defined in the claims, for example.

Advantageous Effects of Invention

According to the present invention, the abnormal state such as the loss or theft of the mobile information terminal can be precisely detected, and the terminal can be prevented from being unnecessarily locked.

DESCRIPTION OF EMBODIMENTS

Examples of the present invention will be described below with reference to the drawings. In each example, abnormality of a mobile communication terminal is determined by not only a communication distance with a cooperating mobile communication terminal but also the combination of position information on each mobile communication terminal or terminal information with the communication distance.

EXAMPLE 1

In Example 1, an abnormal state of a mobile communication terminal is determined with the use of position information on each mobile communication terminal.

Figure 1:
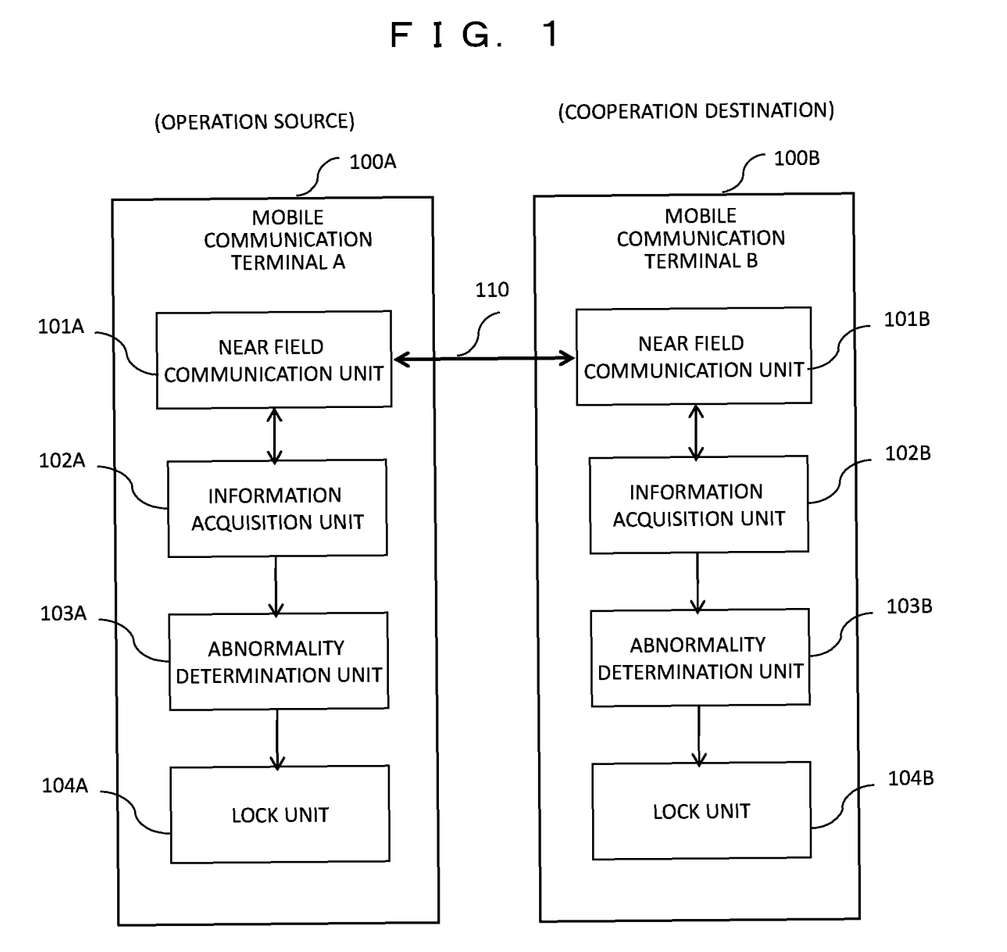
FIG. 1 is a block diagram showing a configuration of a mobile communication terminal according to Example 1.

FIG. 1 is a block diagram showing a configuration of a mobile communication terminal according to Example 1. This example shows a case of using two mobile communication terminals in cooperation in which a mobile communication terminal as an operation source is assumed to be a mobile communication terminal A (100A) and a mobile communication terminal as a cooperation destination is assumed to be a mobile communication terminal B (100B). An abnormal state (loss, theft, or the like) of the mobile communication terminal A as the operation source is determined in cooperation with the mobile communication terminal B. The mobile communication terminal includes, for example, a smartphone, a smart watch, and the like, but a device is not limited as long as communication between the mobile terminals can be performed, and wearable devices such as a head mount display or an activity meter are also applicable. Hereinafter, the mobile communication terminal A as the operation source is referred to simply as "terminal A", and the mobile communication terminal B as the cooperation destination is referred to simply as "terminal B." Since the terminal A and the terminal B cooperate with each other, it is assumed that the initial settings such as an authentication process and a pairing process are performed on each other.

The mobile communication terminal A includes a near field communication unit 101A, an information acquisition unit 102A, an abnormality determination unit 103A, and a lock unit 104A. Usually, the mobile communication terminal includes many other components. In this example, only components related to the abnormality determination function will be taken up and described. The mobile communication terminal B has the same configuration as the mobile communication terminal A, and the respective components corresponding to those in the terminal A are denoted by reference symbols 101B to 104B. As a result, the mobile communication terminal B also has the same abnormality determination function as that of the mobile communication terminal A. However, when the abnormality determination operation or the lock operation is not performed in the mobile communication terminal B, the abnormality determination unit 103B or the lock unit 104B is not indispensable.

The near field communication unit 101A performs near field communication 110 with the short-range communication unit 101B of the terminal B and obtains a communication distance or communication strength to the terminal B. The near field communication system includes, for example, Bluetooth Trademark (registered trademark) and Wi-Fi (registered trademark), but there is no particular limitation of the near field communication system as long as the system can directly communicate with the terminal B.

When the communication distance obtained by the near field communication unit 101A is equal to or more than a threshold value or when the communication strength is equal to or less than a threshold value, the information acquisition unit 102A acquires information necessary for abnormality determination from the terminal A, the terminal B, or both of those terminals A and B. In this example, the information acquisition unit 102A acquires position information on both of the terminal A and the terminal B.

The abnormality determination unit 103A determines whether the terminal A is in the abnormal state (lost or stolen state), or not, based on the information (the position information on the terminal A and the terminal B) acquired by the information acquisition unit 102 A. If it is determined that the terminal A is abnormal, the abnormality determination unit 103A transmits a command to lock the terminal A to the lock unit 104A.

The lock unit 104A locks the terminal A according to the lock command from the abnormality determination unit 103A. A locking method includes a method of requesting authentication at the start of operation of the mobile communication terminal, but there is no particular limitation on the method.

Figure 2:
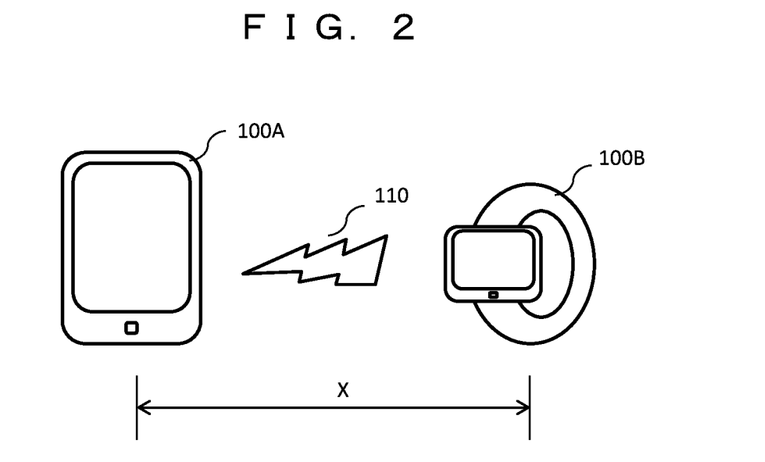
FIG. 2 is a schematic diagram showing near field communication between a mobile communication terminal A and a mobile communication terminal B.

FIG. 2 is a schematic diagram showing near field communication between the mobile communication terminal A and the mobile communication terminal B. In the figure, the near field communication 110 is performed between the terminal 100A such as a smartphone and the terminal 100B such as a smart watch, by using, for example, Bluetooth (registered trademark). If both of the terminals 100A and 100B are carried with the same user, a communication distance X between the terminals is usually close to each other. If the terminal 100A is lost away from the user, the communication distance X between the terminals becomes larger.

Figure 3:
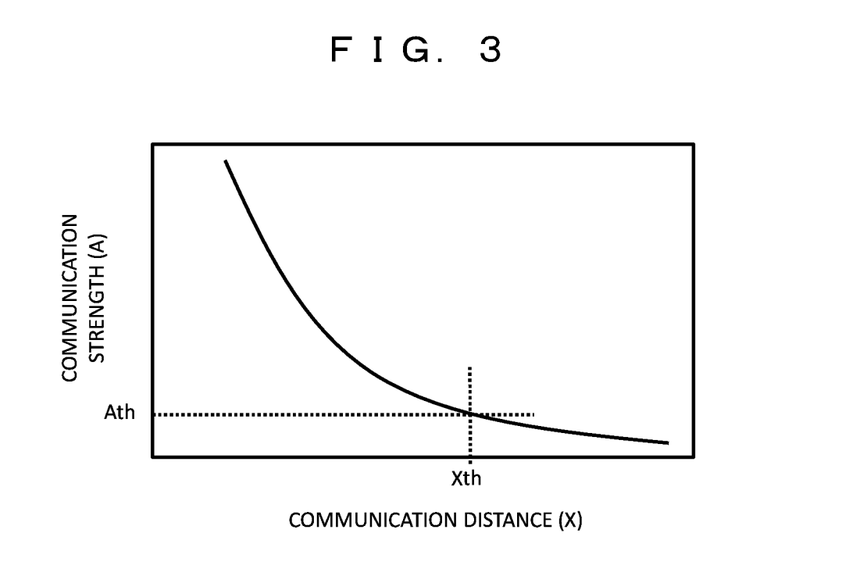
FIG. 3 is a diagram schematically illustrating a relationship between a communication distance and communication strength.

FIG. 3 is a diagram schematically describing a relationship between the communication distance and the communication strength. When there is nothing interfering with communication between the mobile communication terminal A and the mobile communication terminal B, the communication distance X and the communication strength A have a simple inverse proportional relationship. If a relational expression of the above relationship is obtained in advance, the current communication distance X can be calculated according to the communication strength A in the near field communication unit 101A.

In this example, the abnormality determination of the terminal is performed in two stages. In a first stage, it is determined whether or not the communication distance X between the terminals is separated by a predetermined distance Xth (threshold) or more. The threshold value Xth should be set according to a usage situation of the terminal, but if the terminal is used in the home or workplace, the threshold value Xth is set to 10 to several tens of meters, for example. Meanwhile, instead of the threshold value Xth of the communication distance, it may be determined whether or not the current communication strength A has fallen below communication strength Ath (threshold value) corresponding to Xth. However, if only the determination in the first stage is insufficient to know whether a cause of the communication distance X exceeding the threshold value Xth is caused by the abnormal state of the terminal or a temporary event such as the user's leaving.

Therefore, in a second stage, position information (movement state) on the terminal A and the terminal B is acquired to determine whether the terminal is in the abnormal state, or not. In order to enable the terminal A to acquire the position information from the terminal B, the threshold value Xth of the communication distance is set to be smaller than a maximum communicable distance Xmax of the near field communication. This is because when the threshold value Xth is set to be equal to Xmax, the near field communication between the terminals cannot be performed when the communication distance exceeds the threshold value Xth, and the terminal A cannot acquire the position information from the terminal B. A method of determining the abnormality of the terminal according to the first and second stages will be described below.

Figure 4:
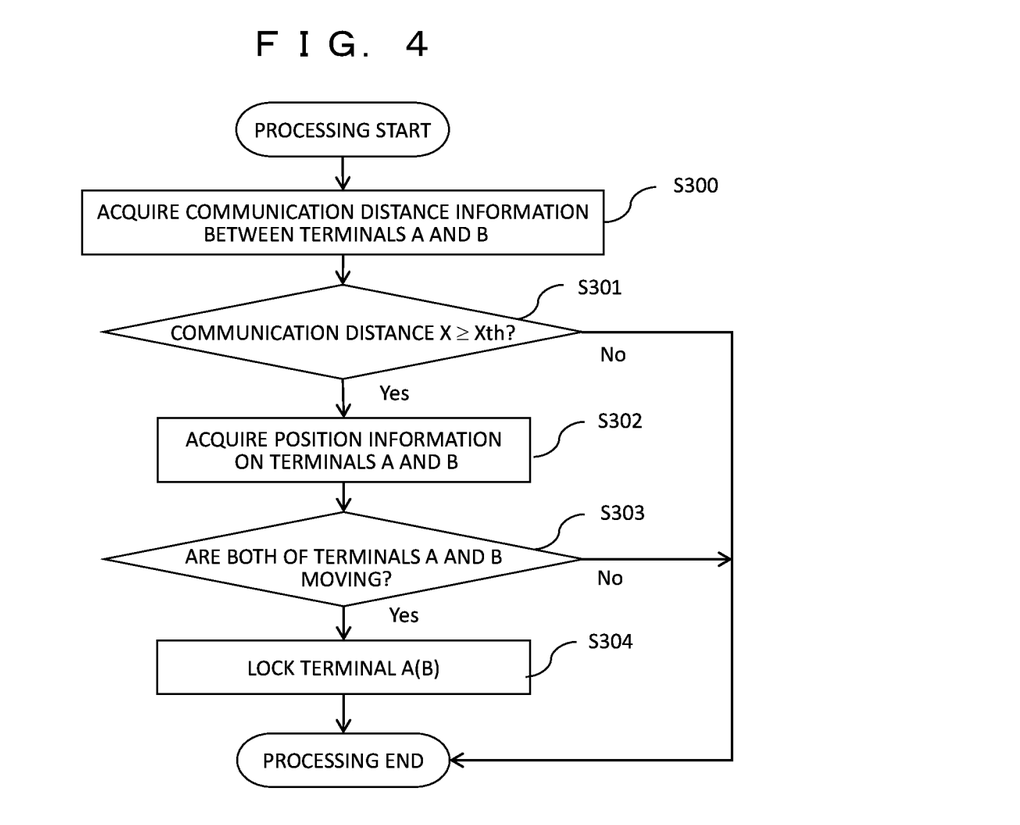
FIG. 4 is a flowchart showing an abnormality determination process of the mobile communication terminal.

FIG. 4 is a flowchart showing an abnormality determination process of the mobile communication terminal. In other words, the terminal A cooperates with the terminal B to determine whether the host terminal A (terminal A) is in the abnormal state, or not.

In S300, the near field communication unit 101A of the terminal A communicates with the terminal B and acquires the communication distance X between both of those terminals.

In S301, the information acquisition unit 102A determines whether the communication distance X received from the near field communication unit 101A is equal to or larger than the threshold value Xth, or not (first stage). As a result of the determination, if the communication distance X is equal to or larger than the threshold value Xth, the process proceeds to S 302. If the communication distance X is smaller than the threshold value Xth, the determination process is terminated.

In S302, the information acquisition unit 102A acquires the position information on both of the terminal A and the terminal B. In this example, the method of acquiring the position information may be, for example, a method of tracking the position of the terminal such as a GPS (Global Positioning System), or a method of determining whether the terminal is moving, or not, with the use of an acceleration sensor of the terminal. The position information on the terminal B is acquired by communicating with the terminal B through the near field communication unit 101A.

In S303, the abnormality determination unit 103A determines whether both of the positions of the terminal A and the terminal B are moving, or not, based on the information acquired by the information acquisition unit 102A (second stage). If the positions of both the terminals are moving, the abnormality determination unit 103A determines that an abnormal condition such as loss or theft occurs, and the process proceeds to S304. If the positions of both the terminals are not moving, the determination process is terminated.

In S304, the abnormality determination unit 103A transmits a command to the lock unit 104A, and the lock unit 104A locks the terminal A. For example, the lock unit 104A sets the terminal A in a locked state requesting authentication from the external operation. The lock unit 104A may lock not only the terminal A but also the terminal B.

The series of processes S300 to S304 described above are periodically repeatedly executed.

Figure 5:
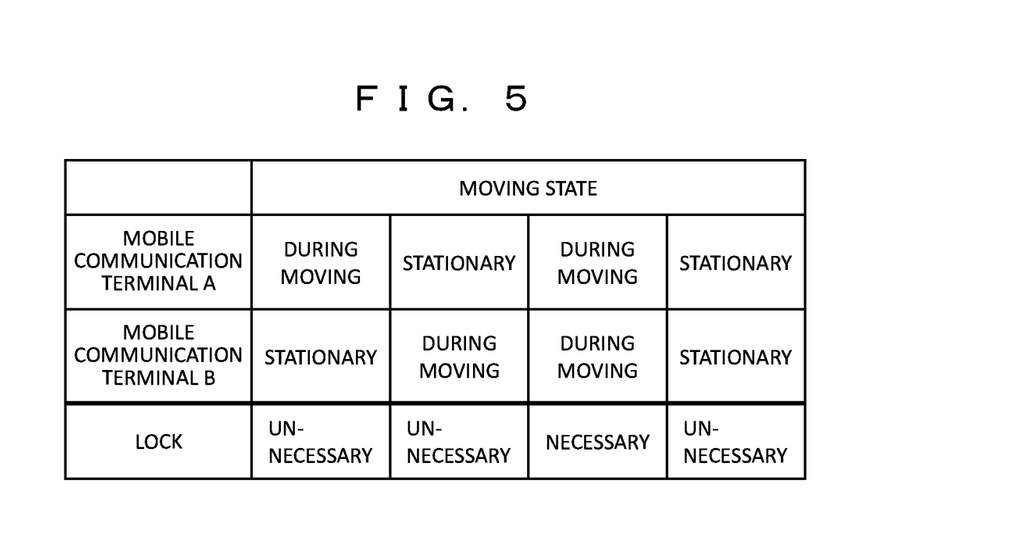
FIG. 5 is a diagram showing criteria for determining necessity of locking in FIG. 4.

FIG. 5 is a diagram showing a criterion for determining the necessity of locking in S303 of FIG. 4. In this example, the necessity of locking is determined according to the moving state of both those terminals, and when both of those terminals are moving, it is determined that there is a need for locking. The reason will be described below.

When one user possesses multiple mobile communication terminals, the user usually uses all the terminals while wearing those terminals or placing those terminals around. If the user puts one terminal A at a certain place and moves to another place while wearing the terminal B, the communication distance between the terminal A and the terminal B may be equal to or more than a threshold value. In that case, the terminal B is moving together with the user and the terminal A is stationary. Hence, in a normal state, it is difficult for both of the terminals to be in a moving state.

On the other hand, in a situation where the user leaves the terminal A in a transportation (vehicle interior or the like) or in a situation where the terminal A is stolen, the terminal A is often moving. Hence, when the communication distance between the terminal A and the terminal B is equal to or more than the threshold value, and both of those terminals are moving, it is determined that the terminal is in the abnormal state such as loss or theft. As described above, with the use of the distance information and the moving state information on the multiple terminals in combination, it is possible to accurately determine and prevent the abnormal state of the mobile communication terminal.

Further, in the abnormality determination, a determination with higher accuracy can be performed by adding the position information on where the mobile communication terminal is located.

Figure 6:
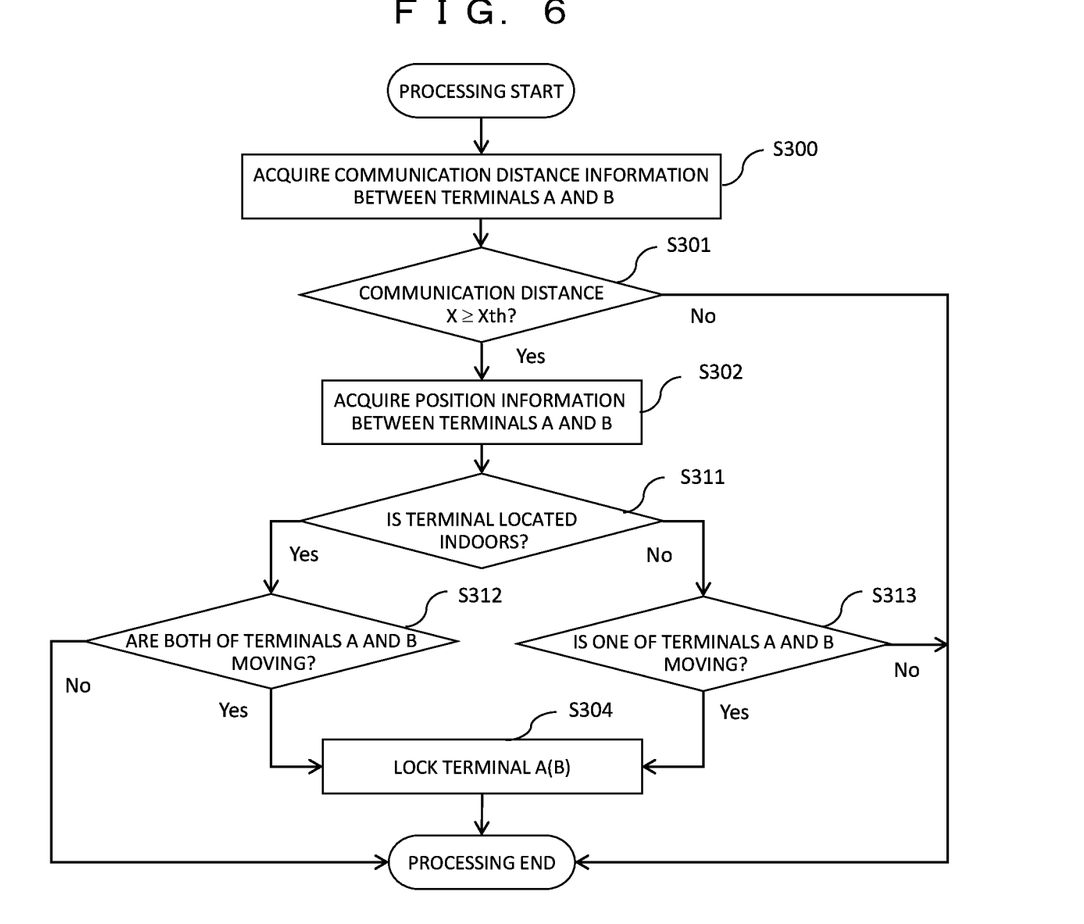
FIG. 6 is a flowchart showing an abnormality determination process of the mobile communication terminal.

FIG. 6 is a flowchart showing the abnormality determination process of the mobile communication terminal. FIG. 6 shows a process in which S311 to S413 are added to or changed from the flowchart of FIG. 4.

In S311, it is determined whether the terminals A and B are located indoors, or not, based on the position information acquired in S302. For example, the determination can be performed based on GPS information. If the terminals A and B are placed indoors, the process proceeds to S312, and if the terminals A and B are placed outdoors, the process proceeds to S313.

In S312, as in S303 of FIG. 4, it is determined whether the positions of the terminal A and the terminal B are both moving, or not. If both of those terminals are moving, it is determined that the abnormal state has occurred, and the process proceeds to S304 in which the terminal A is locked.

In S313, it is determined whether one of the positions of the terminal A and the terminal B is moving, or not. When one of them is moving, it is determined that the abnormal state has occurred, and the process proceeds to S304 to lock the terminal A.

Figure 7:
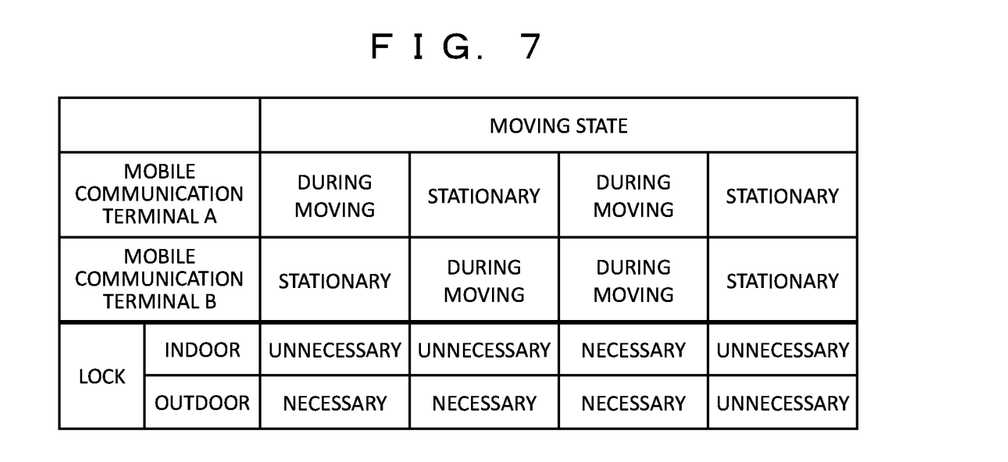
FIG. 7 is a diagram showing criteria for determining the necessity of locking in FIG. 6.

FIG. 7 is a diagram showing criteria for determining the necessity of locking in S311 to S313 of FIG. 6. The criterion of the necessity of locking is changed depending on whether the positions of the terminals A and B are indoor or outdoor. In the case where the terminal is outdoors, since the risk of loss or theft is increased, it is determined that there is a necessity of locking if at least any terminal is moving. According to the method of FIGS. 6 and 7, the strength of security is changed according to the position situation of the terminal, thereby being capable of performing the abnormality determination with higher accuracy.

Incidentally, as a method for releasing the lock of the mobile communication terminal A locked in this example, there are a password input to an approval screen, fingerprint authentication by the user, and so on. However, once the lock is released, the lost or theft prevention function according to this example may be stopped until the near field communication with the communication terminal B is again performed. As a result, in the case of a simple misplacement, the subsequent unnecessary lock can be prevented by causing the user to release the lock. As another lock releasing method, when the locked terminal A is moved and the near field communication with the original terminal B is enabled again, the lock may be released at that time point. As a result, even if the terminal A is locked at an unintended timing, the lock can be automatically released, thereby improving the convenience.

In this example, the mobile communication terminal as the operation source is defined as the terminal A, the mobile communication terminal as the cooperation destination is defined as the terminal B, and the abnormal state of the terminal A is determined. Alternatively, a relationship between the terminals A and B may be reversed. In other words, the method of this example may be applied to the determination of the abnormal state of the cooperation destination terminal B. Further, the method of this example may be applied to the determination of the abnormal states of both the operation source terminal and the cooperation destination terminal.

In relation to the above configuration, in S304 of FIG. 4 or 6, the lock command of the terminal A is transmitted to the terminal B through the near field communication unit 101A, thereby being capable of locking the terminal B by the lock unit 104B. Alternatively, both of the terminal A and the terminal B can be locked by the lock units 104A and 104B. This makes it possible to reliably lock the mobile communication terminal and improve the strength of security even if one of the terminal A and the terminal B is lost (or stolen). The same is applied to the respective examples to be described later.

Although processing between two mobile communication terminals has been described in this example, any number may be used as long as the number of mobile communication terminals is two or more. In that case, the operation described in this example may be performed on all of the mobile communication terminals that are in the near field communication.

According to Example 1, with the use of the position information and the moving state information on the multiple terminals, it is possible to accurately detect and prevent the abnormal state of the mobile communication terminal. Hereinafter, other methods for determining the abnormal state of the mobile communication terminal will be described in several examples.

EXAMPLE 2

In Example 2, an abnormality is determined with the use of wearing information on whether a cooperating mobile communication terminal B is being worn by a user. If a single user possesses multiple terminals A and B, a communication distance between the terminals A and B is equal to or more than a threshold value, and the terminal B is worn by the user, it is clear that the terminal A has moved to a position distant from the user, and the possibility of the loss or theft of the terminal A is increased. Therefore, such a situation is determined to be an abnormal state.

Figure 8:
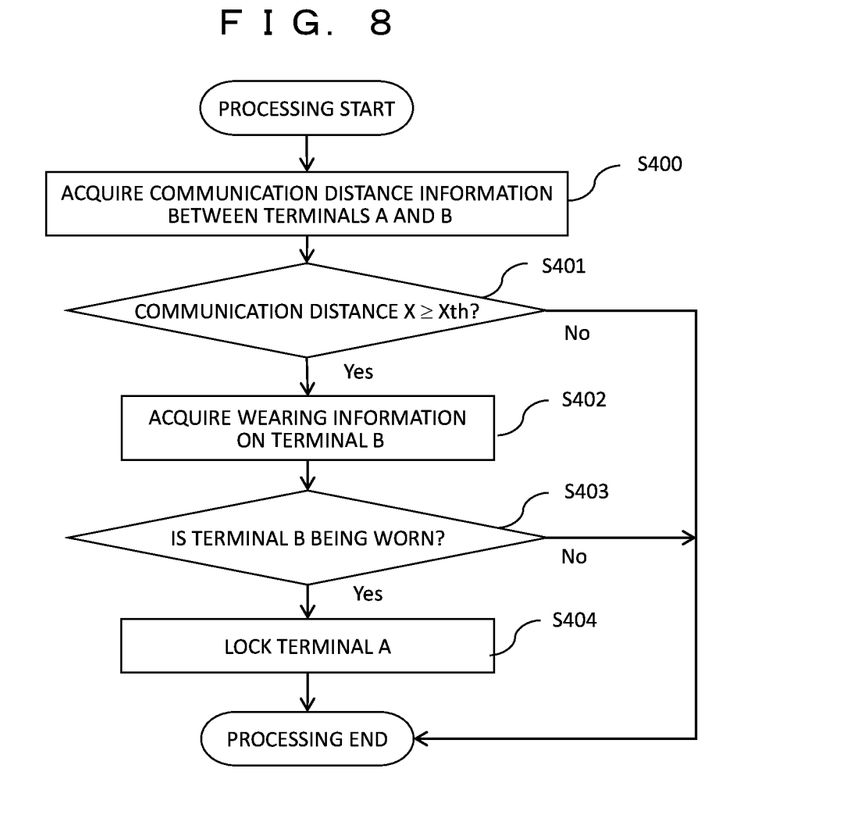
FIG. 8 is a flowchart showing an abnormality determination process of a mobile communication terminal according to Example 2.

FIG. 8 is a flowchart showing an abnormality determination process of the mobile communication terminal according to Example 2. A difference from Example 1 (FIG. 4) resides in that for the purpose of abnormality determination, wearing information on whether or not the cooperating mobile communication terminal B is being worn by the user. Hereinafter, a description duplicated with that of FIG. 4 will be simplified.

In S400, a communication distance X between the terminals A and B is acquired. In S401, it is determined whether the communication distance X is equal to or more than the threshold Xth, or not. As a result of the determination, if the communication distance X is equal to or more than the threshold Xth, the process proceeds to S402.

In S402, an information acquisition unit 102A acquires the wearing information from the terminal B. As information for determining whether the terminal B is being worn, or not, information on whether the terminal is operated, or not, may be used. For example, the mobile communication terminal is of a wearing type such as a wristwatch type, it can also be determined whether the terminal is being worn by acquiring physical information, or not.

In S403, the abnormality determination unit 103A determines whether the terminal B is being worn, or not, based on the wearing information acquired by the information acquisition unit 102A. In the case where the terminal B is being worn, the abnormal state occurs in the terminal A, and the process proceeds to S404. In S404, the abnormality determination unit 103A transmits a command to the lock unit 104A, and the lock unit 104A locks the terminal A.

According to Example 2, the abnormal state of the terminal A can be detected with accuracy with the use of the wearing information on the cooperating mobile communication terminal B. Incidentally, when the terminal B is a device of the wearing type (wearable device), it may be checked whether a wearer matches the user, or not, according to the wearing information. This makes it possible to determine that the terminal B is stolen and worn by other than the user, and to perform theft prevent with more accuracy.

EXAMPLE 3

In Example 3, an abnormality state of a terminal A is determined with the use of charging information on whether a mobile communication terminal A is being charged, or not. If multiple terminals A and B are possessed by a single user, the terminal A cannot be moved while being charged and may be distant from the terminal B. In that case, the user moves the terminal B while intentionally leaving the terminal A, and the possibility of loss or theft is low, and the terminals A and B are excluded from abnormality determination.

Figure 9:
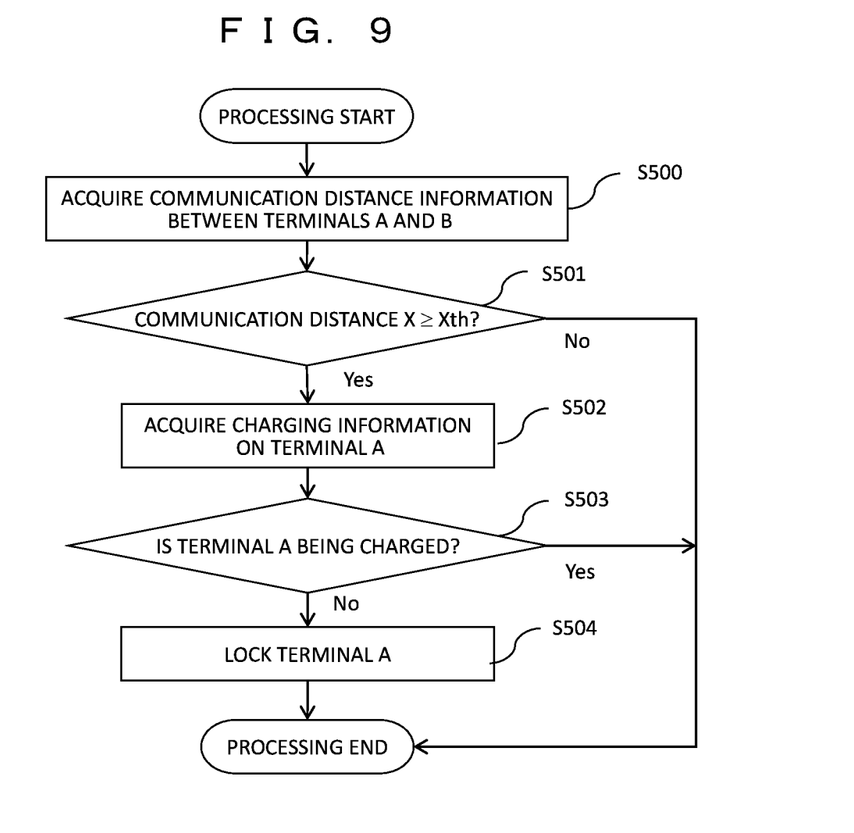
FIG. 9 is a flowchart showing an abnormality determination process of a mobile communication terminal according to Example 3.

FIG. 9 is a flowchart showing an abnormality determination process of the mobile communication terminal according to Example 3. This example is different from Example 1 (FIG. 4) in that for the purpose of the abnormality determination, the charging information on whether the mobile communication terminal A is being charged, or not, is used. Hereinafter, a description duplicated with that of FIG. 4 will be simplified.

In S500, a communication distance X between the terminals A and B is acquired. It is determined in S501 whether or not the communication distance X is equal to or more than the threshold Xth. As a result of the determination, if the communication distance X is equal to or more than the threshold Xth, the process proceeds to Step S502.

In S502, the information acquisition unit 102A acquires the charging information on the terminal A. In other words, the information acquisition unit 102A acquires information on whether a charger is connected to the terminal A, or not, or acquires information on whether charging is in progress, or not, from the power management unit.

In S503, the abnormality determination unit 103A determines whether the terminal A is being charged, or not, based on the charging information acquired by the information acquisition unit 102A. If the terminal A is being charged, it is determined that the terminal A is not the abnormal state such as loss or theft, and the process is terminated. If the terminal A is not being charged, the process proceeds to S504. In S504, the abnormality determination unit 103A transmits a command to the lock unit 104A, and the lock unit 104A locks the terminal A.

According to Example 3, since the mobile information terminal A is being charged, the mobile information terminal A is not locked, unnecessary locking operation can be avoided and usability can be improved.

EXAMPLE 4

In Example 4, abnormality is determined with the use of battery level information held by a mobile communication terminal A. Usually, the mobile communication terminal is charged by a user so that a battery level does not become zero, but the lost mobile communication terminal is not charged and the battery level can be equal to or less than the threshold value, for example, 0. Also, if the battery level is insufficient, the near field communication is disconnected and distance information cannot be acquired. Therefore, such a situation is determined as an abnormal state.

Figure 10:
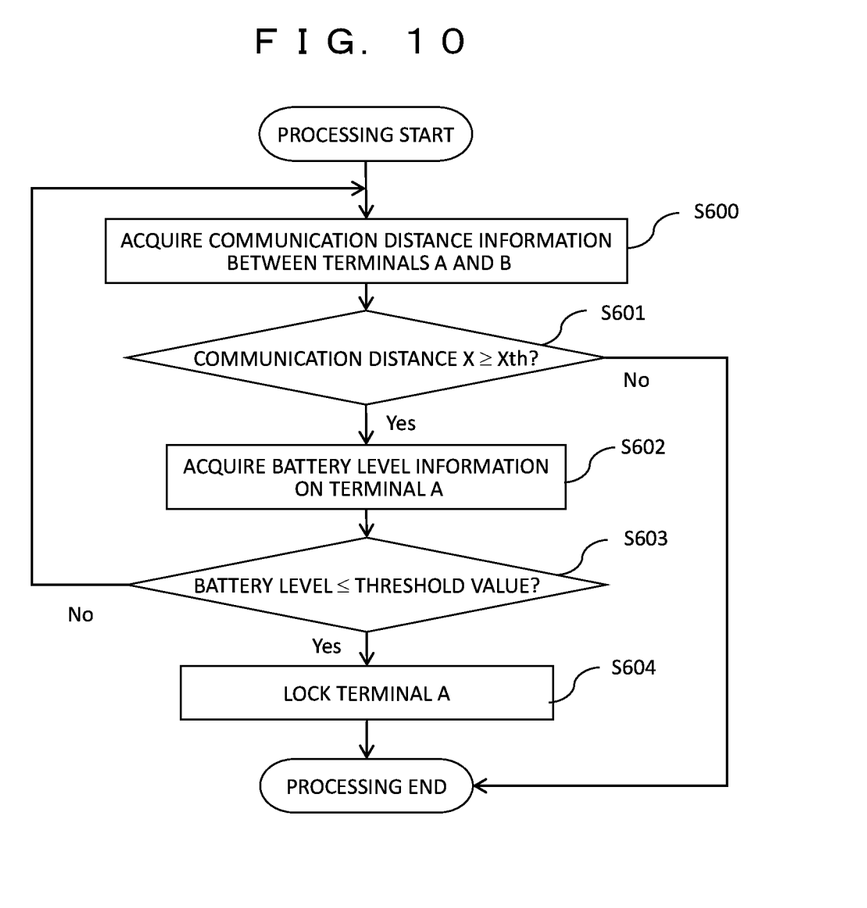
FIG. 10 is a flowchart showing an abnormality determination process of a mobile communication terminal according to Example 4.

FIG. 10 is a flowchart showing an abnormality determination process of the mobile communication terminal according to Example 4. A difference from Example 1 (FIG. 4) resides in that for the purpose of determining abnormality, the battery level held by the mobile communication terminal A is leveraged. A description duplicated with that in FIG. 4 will be simplified below.

In S600, a communication distance X between the terminals A and B is acquired. In S601, it is determined whether or not the communication distance X is equal to or more than a threshold value Xth. As a result of the determination, when the communication distance X is equal to or more than the threshold Xth, or when the communication distance X cannot be acquired by the near field communication, the process proceeds to S602.

In S602, the information acquisition unit 102A acquires battery level information from the terminal A. The battery level information can be acquired from the power management unit.

In S603, the abnormality determination unit 103A determines whether or not the battery level is equal to or less than the threshold value, based on the battery level information acquired by the information acquisition unit 102A. If the battery level is equal to or less than the threshold value, the abnormality determination unit 103A detects the abnormal state such as loss or theft has occurred, and the process proceeds to S604. When the battery level is not equal to or less than the threshold value, the process returns to S600 and the abnormality determination unit 103A determines the communication distance again.

In S604, the abnormality determination unit 103A sends a command to the lock unit 104A, and the lock unit 104A locks the terminal A.

According to Example 4, the lock unit 104A locks the mobile communication terminal A when the battery level of the mobile communication terminal A becomes equal to or less than the threshold value, thereby being capable of detecting the abnormal state with high accuracy.

EXAMPLE 5

In Example 5, a mobile communication terminal A has a telecommunication function, switches between near field communication and telecommunication according to a communication status with a mobile communication terminal B, accurately acquires position information and terminal information on the terminal B, and determines an abnormal state such as loss or theft with high precision. In this example, the near field communication enables a direct communication between the terminals as described in Example 1 whereas the telecommunication enables communication with the terminal B with the use of the Internet by connecting the terminal B to the Internet using a 3G line, an LTE (Long Term Evolution) or the like. In Example 1, Wi-Fi is defined as the near field communication, but Wi-Fi may be treated as the telecommunication as far as the terminal B can be connected to the Internet.

Figure 11:
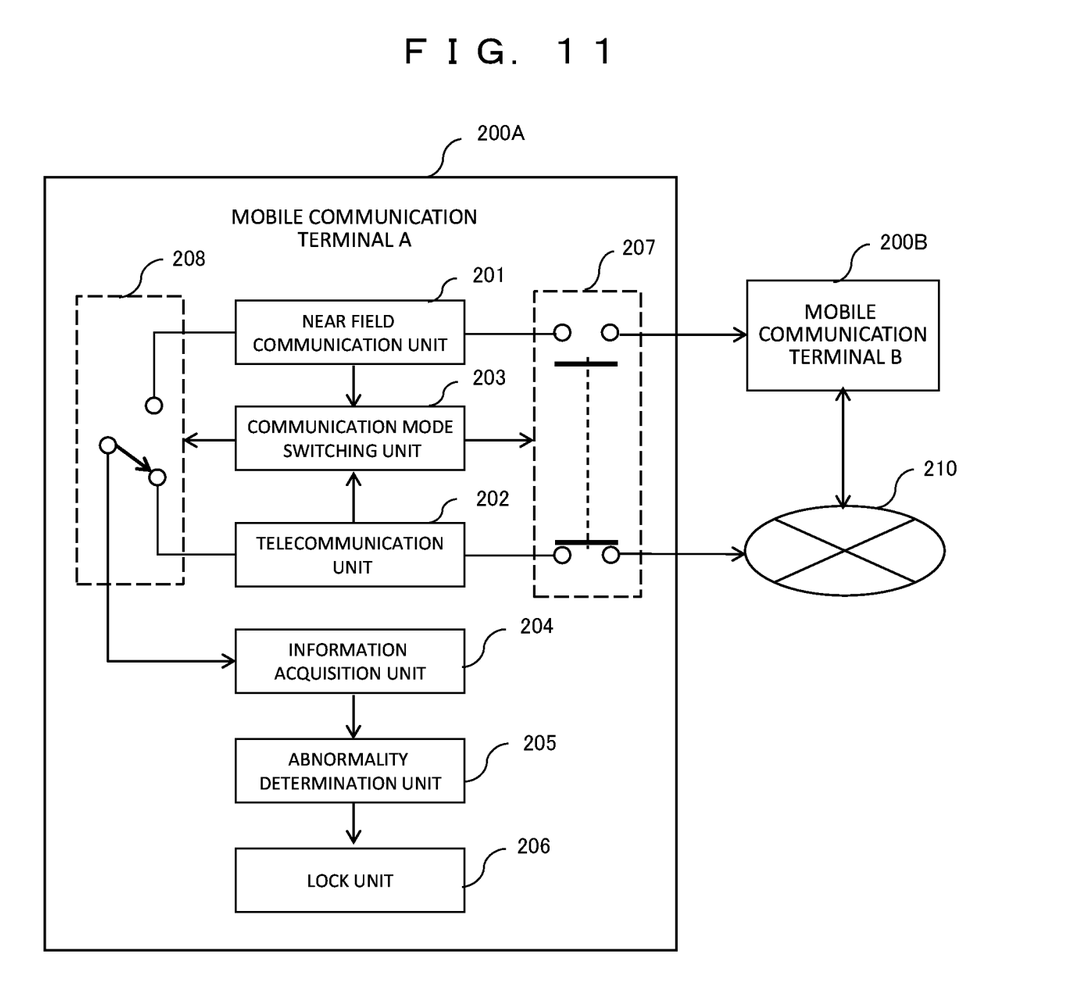
FIG. 11 is a block diagram showing a configuration of a mobile communication terminal according to Example 5.

FIG. 11 is a block diagram showing a configuration of the mobile communication terminal according to Example 5. The mobile communication terminal A (200A) as an operation source adds a telecommunication unit 202, a communication mode switching unit 203, and switches 207 and 208 to the configuration of the mobile communication terminal A (100A) in Example 1 (FIG. 1). The other components 201, 204, 205, and 206 correspond to the respective components in FIG. 1. Meanwhile, the mobile communication terminal B (200B) also has the same configuration as that of the mobile communication terminal A (200A).

When the terminal A performs the near field communication with the terminal B, the communication mode switching unit 203 connects the switches 207 and 208 to the near field communication unit 201 side, and when the terminal A performs the telecommunication, the communication mode switching unit 203 switches the switches 207 and 208 to the telecommunication unit 202 side. In the telecommunication, the terminal A communicates with the terminal B through the Internet line 210.

Figure 12:
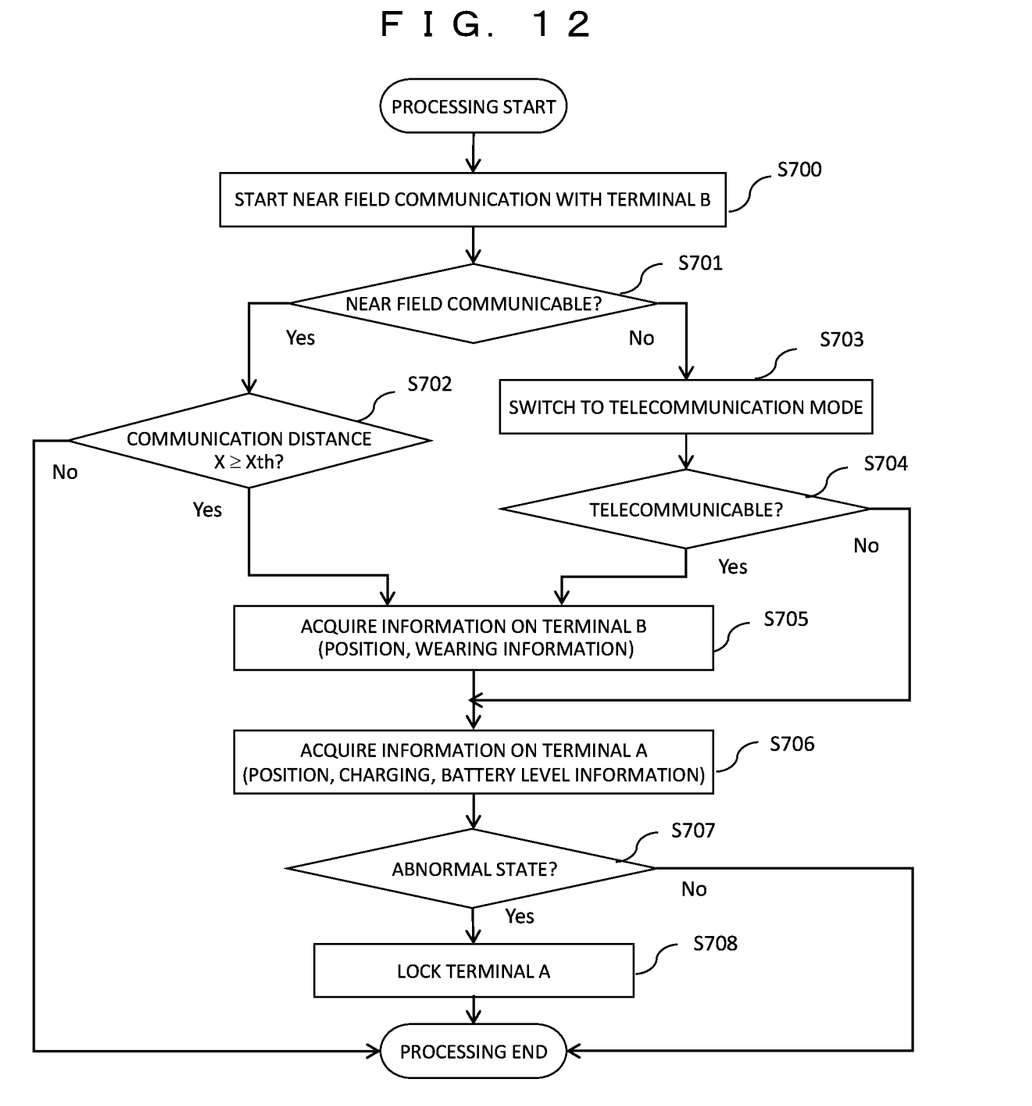
FIG. 12 is a flowchart showing an abnormality determination process of the mobile communication terminal.

FIG. 12 is a flowchart showing an abnormality determination process of the mobile communication terminal.

In S700, the communication mode switching unit 203 connects the switches 207 and 208 to the near field communication unit 201 side and starts communication with the terminal B by the near field communication unit 201.

In S701, the communication mode switching unit 203 receives the communication distance information with the terminal B from the near field communication unit 201 and determines whether the near field communication can be performed, or not. If the near field communication is enabled, the process proceeds to S702, and the communication mode switching unit 203 determines whether or not the communication distance X is equal to or more than a threshold value Xth. As a result of the determination, if the communication distance X is equal to or more than the threshold value Xth, the process proceeds to S705 and the communication mode switching unit 203 acquires information from the terminal B by the near field communication. Next, in S706, the communication mode switching unit 203 acquires information from the terminal A. If the communication distance X is less than the threshold value Xth, the process is terminated.

When it is determined in S701 that the near field communication is disabled, the process proceeds to S703.

In S703, the communication mode switching unit 203 connects the switches 207 and 208 to the telecommunication unit 202 side and switches to the telecommunication mode. As a result, the terminal A is connected to the Internet line 210 by the telecommunication unit 202. In S704, the communication mode switching unit 203 determines whether telecommunication is enabled, or not. If the telecommunication is enabled, the process proceeds to S705, and the communication mode switching unit 203 acquires information from the terminal B through the Internet line 210. Subsequently, in S706, the communication mode switching unit 203 acquires information from the terminal A. If the telecommunication is disabled in S704, the process proceeds to S706.

In S705, the information acquisition unit 204 acquires information from the terminal B by the near field communication unit 201 or the telecommunication unit 202. At that time, the information acquired from the terminal B includes position information and wearing information on the terminal B, and so on as described in Example 1 and Example 2.

In S706, the information acquisition unit 204 acquires information from the terminal A. The information acquired from the terminal A includes the position information, the charging information, the battery level information on the terminal A, and so on as described in Example 1, Example, 3, and Example 4.

In S707, the abnormality determination unit 205 determines whether the terminal A is in an abnormal state, or not, according to the information of the terminal B and/or the terminal A acquired by the information acquisition unit 204. The determination criteria at that time are any determination criteria in Example 1 to Example 4. Alternatively, the respective determination criteria may be appropriately combined together, and it may be determined that the terminal A is in the abnormal state when an abnormality occurs in one of the determination criteria.

If the abnormality determination unit 205 determines that the terminal A is in the abnormal state, the process proceeds to S708, the abnormality determination unit 205 transmits a command for locking the terminal A to the lock unit 206, and the lock unit 206 locks the terminal A.

The series of processes S700 to S708 described above are executed repeatedly at predetermined time intervals.

In the above Examples 1 to 4, when the near field communication is disabled, information on the terminal B cannot be acquired, and the abnormal state must be determined with the use of only the information on the terminal A per se. On the other hand, according to Example 5, even when the near field communication is disabled, the information on the terminal B can be acquired by switching the communication mode to telecommunication, and the abnormal state can be determined with high accuracy. If a timing at which to switch from the near field communication to the telecommunication is set to not a timing at which the near field communication becomes disabled but a timing at which the communication distance in the near field communication becomes the threshold value or more, switching from the near field communication to the telecommunication is enabled without disconnecting the communication, and the reliability can be further improved.

Although the method of switching between the near field communication and the telecommunication has been described in this example, both communication modes of the near field communication and the telecommunication may be used at the same time. As a result, time and labor for switching the communication mode to the other are not required, the communication mode with higher communication strength can be continuously used, and the accuracy of abnormality determination is improved.

The present invention is not limited to the examples described above, but includes various modifications. For example, in order to easily understand the present invention, the above examples have been described in detail, and the present invention is not always limited to the provision of all the configurations described above. Also, a part of a configuration of one example can be replaced with another configuration, and the configuration of one example can be added with the configuration of another example. Also, in a part of the respective configuration examples, another configuration can be added, deleted, or replaced.

In addition, each of the above-described configurations, functions, processing units, processing means and the like may be realized in hardware by designing some or all of those components by, for example, an integrated circuit. Furthermore, the above-described configurations, functions and so on may be realized by software by interpreting and executing a program that realizes the respective functions by a processor. Information on programs, tables, files, and the like realizing each function may be stored in a memory, a recording device such as a hard disk, an SSD (Solid State Drive), or a recording medium, or a recording medium such as an IC card, an SD card, or a DVD.

Also, the control lines and the information lines necessary for description are illustrated, and all of the control lines and the information lines necessary for products are not illustrated. In fact, it may be conceivable that most of the configurations are connected to each other.

REFERENCE SIGNS LIST

100A . . . mobile communication terminal A, 100B . . . mobile communication terminal B, 101 . . . near field communication unit, 102 . . . information acquisition unit, 103 . . . abnormality determination unit, 104 . . . lock unit, 200A . . . mobile communication terminal A, 2002 . . . mobile communication terminal B, 201 . . . near field communication unit, 202 . . . telecommunication unit, 203 . . . communication mode switching unit, 204 . . . information acquisition unit, 205 . . . abnormality determination unit, 206 . . . lock unit, 207, 208 . . . switch, 210 . . . Internet line.

The invention claimed is:

1. A mobile communication terminal that performs communication with a second mobile communication terminal, the mobile communication terminal comprising:
near field wireless communication circuitry that performs near field wireless communication with the second mobile communication terminal by radio and obtains a distance to the second mobile communication terminal based on strength of the radio from the second mobile communication terminal;
a GPS signal receiver;
an accelerometer; and
a processor configured to:
determine whether the distance to the second mobile communication terminal is equal to or more than a threshold;
upon determination that the distance is equal to or more than the threshold, acquire (1) a first movement information of the mobile communication terminal via at least one of the GPS signal receiver and the accelerometer, and (2) a second movement information of the second mobile communication terminal via the near field wireless communication circuitry;
determine whether an abnormal state is occurring or not based on the first movement information and the second movement information, the first movement information indicating that the mobile communication terminal is moving or not, and the second moving information indicating that the second mobile communication terminal is moving or not; and
lock at least one of the mobile communication terminal and the second mobile communication terminal via the near field wireless communication circuitry upon determination that the abnormal state is occurring,
wherein, in a first abnormal determination mode, the processor determines that the abnormal state is occurring when both the mobile communication terminal and the second mobile communication terminal are moving,
wherein, in a second abnormal determination mode, the processor determines that the abnormal state is occurring when either the mobile communication terminal or the second mobile communication terminal is moving, and wherein the processor is further configured to control switching the first abnormal determination mode and the second abnormal determination mode based on a predetermined condition.

2. A control method for a mobile communication terminal that performs communication with a second mobile communication terminal, the control method comprising:

performing, by near field wireless communication circuitry, near field wireless communication with the second mobile communication terminal by radio and obtaining a distance to the second mobile communication terminal based on strength of the radio from the second mobile communication terminal;

determining whether the distance to the second mobile communication terminal is equal to or more than a threshold;

upon determination that the distance is equal to or more than the threshold, acquiring (1) a first movement information of the mobile communication terminal via at least one of a GPS signal receiver and an accelerometer included in the mobile communication terminal, and (2) a second movement information of the second mobile communication terminal via the near field wireless communication;

determining whether an abnormal state is occurring or not based on the first movement information and the second movement information, the first movement information indicating that the mobile communication terminal is moving or not, and the second moving information indicating that the second mobile communication terminal is moving or not; and locking at least one of the mobile communication terminal and the second mobile communication terminal via the near field wireless communication upon determination that the abnormal state is occurring, wherein the determining whether the abnormal state is occurring includes determining that, in a first abnormal determination mode, the abnormal state is occurring when both the mobile communication terminal and the second mobile communication terminal are moving, wherein the determining whether the abnormal state is occurring includes determining that, in a second abnormal determination mode, the abnormal state is occurring when either the mobile communication terminal or the second mobile communication terminal is moving, and wherein the control method further comprises switching the first abnormal determination mode and the second abnormal determination mode based on a predetermined condition.

3. The mobile communication terminal according to claim 1, wherein the processor is further configured to detect whether the mobile communication terminal is located indoor or outdoor using current position information detected by at least a GPS signal received via the GPS signal receiver; and wherein the predetermined condition is whether the mobile communication terminal is located indoor or outdoor.

4. The mobile communication terminal according to claim 3, wherein the processor is further configured to determine, whether the abnormal state is occurring or not, in the first abnormal determination mode when the mobile communication terminal is located indoor or in the second abnormal determination mode when the mobile communication terminal is located outdoor.

5. The mobile communication terminal according to claim 1, wherein the processor is further configured to acquire wearing information indicating that the second mobile communication terminal is being worn by a user or not, from the second mobile communication terminal via the near field wireless communication circuitry, and wherein the predetermined condition is whether the second mobile communication terminal is being worn by the user or not, indicated by the wearing information.

6. The mobile communication terminal according to claim 1, wherein the processor is further configured to acquire charging information indicating that the mobile communication terminal is being charged or not, from a battery control circuitry of the mobile communication terminal, and wherein the predetermined condition is whether the second mobile communication terminal is being charged or not, indicated by the charging information.

7. The mobile communication terminal according to claim 1, wherein the mobile communication terminal is further comprising wide area wireless communication circuitry that performs wireless communication with the second mobile communication terminal, and wherein the processor is further configured to switch from the near field wireless communication circuitry to the wide area wireless communication circuitry when the communication with the second mobile communication terminal via the near field wireless communication circuitry cannot be performed.

8. The mobile communication terminal according to claim 7, wherein the wide area wireless communication circuitry is based on LTE mobile communication standard or Wi-Fi communication standard.

9. The mobile communication terminal according to claim 1, wherein the near field wireless communication circuitry is based on Bluetooth standard.

10. A mobile communication terminal that performs communication with a second mobile communication terminal, the mobile communication terminal comprising:

near field wireless communication means that performs near field wireless communication with the second mobile communication terminal by radio and obtains a distance to the second mobile communication terminal based on strength of the radio from the second mobile communication terminal;

a GPS signal receiver;

an accelerometer; and a processor configured to:

determine whether the distance to the second mobile communication terminal is equal to or more than a threshold;

upon determination that the distance is equal to or more than the threshold, acquire (1) a first movement information of the mobile communication terminal via at least one of the GPS signal receiver and the accelerometer, and (2) a second movement information of the second mobile communication terminal via the near field wireless communication means;

determine whether an abnormal state is occurring or not based on the first movement information and the second movement information, the first movement information indicating that the mobile communication terminal is moving or not, and the second moving information indicating that the second mobile communication terminal is moving or not; and lock at least one of the mobile communication terminal and the second mobile communication terminal via the near field wireless communication means upon determination that the abnormal state is occurring, wherein, in a first abnormal determination mode, the processor determines that the abnormal state is occurring when both the mobile communication terminal and the second mobile communication terminal are moving, wherein, in a second abnormal determination mode, the processor determines that the abnormal state is occurring when either the mobile communication terminal or the second mobile communication terminal is moving, and wherein the processor is further configured to control switching the first abnormal determination mode and the second abnormal determination mode based on a predetermined condition.

11. The control method according to claim 2, further comprising detecting whether the mobile communication terminal is located indoor or outdoor using current position information detected by at least a GPS signal received via the GPS signal receiver, wherein the predetermined condition is whether the mobile communication terminal is located indoor or outdoor.

12. The control method according to claim 11, wherein the determining whether an abnormal state is occurring includes determining, whether the abnormal state is occurring or not, in the first abnormal determination mode when the mobile communication terminal is located indoor or in the second abnormal determination mode when the mobile communication terminal is located outdoor.

13. The control method according to claim 2, further comprising acquiring wearing information indicating that the second mobile communication terminal is being worn by a user or not, from the second mobile communication terminal via the near field wireless communication, wherein the predetermined condition is whether the second mobile communication terminal is being worn by the user or not, indicated by the wearing information.

14. The control method according to claim 2, further comprising acquiring charging information indicating that the mobile communication terminal is being charged or not, from a battery control circuitry of the mobile communication terminal, wherein the predetermined condition is whether the second mobile communication terminal is being charged or not, indicated by the charging information.

15. The control method according to claim 2, further comprising:

performing, by wide area wireless communication circuitry, wireless communication with the second mobile communication terminal; and switching from the near field wireless communication circuitry to the wide area wireless communication circuitry when the communication with the second mobile communication terminal via the near field wireless communication circuitry cannot be performed.

* * * * *